United States Patent [19]
Lundquist, Jr. et al.

[11] 3,919,062
[45] Nov. 11, 1975

[54] ELECTROCHEMICAL SYSTEM GRADUATED POROUS BED SECTIONS

[75] Inventors: Joseph Theodore Lundquist, Jr., Columbia, Md.; Jose D. Giner, Sudbury, Mass.

[73] Assignee: W. R. Grace & Co., New York, N.Y.

[22] Filed: Apr. 29, 1974

[21] Appl. No.: 464,775

[52] U.S. Cl. ............ 204/149; 204/130; 204/152; 204/254; 204/255; 204/294
[51] Int. Cl.² .......................................... C25F 5/00
[58] Field of Search ........... 204/130, 149, 152, 252, 204/253, 254, 255, 268, 283, 284, 291

[56] References Cited
UNITED STATES PATENTS

| | | | |
|---|---|---|---|
| 883,170 | 3/1908 | Christy | 204/291 X |
| 1,312,756 | 8/1919 | Stover | 204/268 |
| 2,563,903 | 8/1951 | Zadra | 204/109 X |
| 3,379,637 | 4/1968 | O'Brien | 204/309 |
| 3,457,152 | 7/1969 | Maloney, Jr. et al. | 204/131 |
| 3,515,664 | 6/1970 | Johnson et al. | 204/301 |
| 3,553,092 | 1/1971 | Mund et al. | 204/180 P |

*Primary Examiner*—John H. Mack
*Assistant Examiner*—A. C. Prescott
*Attorney, Agent, or Firm*—L. Gene Wise

[57] ABSTRACT

A process and apparatus for conducting electrochemical treatment in a reaction zone containing electrically conductive particles, such as carbon pellets. A plurality of beds within an electrolysis reaction chamber are separated by foraminous insulators which define bed sections of varying thickness.

In the improved electrochemical cell, a porous bed of electrically conductive particles is disposed between primary electrodes to define a reaction zone and means is provided for flowing electrolyte through the bed substantially parallel to voltage gradient between the primary electrodes. The system provides insulating spacer means for separating the porous bed transverse to the direction of flow to provide ionically conducting fluid paths between sections of the bed while preventing ohmic conduction between bed sections. The spacers are disposed to define bed sections having graduated thickness where homogeneous treatment of the electrolyte is obtained.

The system is useful for pollution control, electrochemical synthesis and metal recovery.

14 Claims, 8 Drawing Figures

ELECTROCHEMICAL SYSTEM GRADUATED POROUS BED SECTIONS

BACKGROUND OF THE INVENTION

The present invention relates to electrochemical processes and reactors, and more specifically to electrochemical reactions conducted in a series of particulate bed sections.

It is generally known that many electrochemical reactions may be conducted rapidly and efficiently in particulate bed zones. Economic recovery of metal ions from dilute aqueous solution may be achieved by the use of particulate carbon in the reaction zone between primary electrodes.

Electrolysis cells utilizing particulate carbon electrodes are known which comprise a tank having particulate carbon and spaced primary electrodes in contact with the carbon or insulated by a diaphragm or screen. As aqueous electrolyte solution is passed through the carbon bed and an electrochemical reaction occurs in carbon particle bed, which may function anodically or cathodically.

Typical prior art electrolysis cells employing carbon bed reaction zones are disclosed in U.S. Pat Nos. 3,616,356, 3,679,565, 3,716,459, 3,719,570, 3,730,885 and 3,764,499, incorporated herein by reference. Primary emphasis is placed on the use of carbon, usually graphite, as a porous bed material. However, it is understood by those skilled in the art that other electrically conductive or semiconductive particles can be utilized depending upon the desired use of the cell. In U.S. Pat. Nos. 3,728,238 and 3,730,864, various metals, compounds and other materials are disclosed which are useful in the present invention. The use of graphite particles mixed with insulating glass beads is suggested in U.S. Pat. No. 3,761,383.

While conventional single bed reaction devices are useful in instances where relatively small quantities of dilute electrolyte are treated, it is frequently found that these prior art cells are not capable of handling large quantities of waste solutions encountered in industrial processes.

SUMMARY OF THE INVENTION

It has been discovered that improved electrochemical treatment can be obtained in a porous bed electrochemical cell having a reaction zone containing electrically conductive particles. In the improved system, the porous bed is divided transversely by insulating foraminous spacers which define bed sections operatively connected for serial fluid flow between bed sections with bed section thickness in the direction of electrolyte flow increasing as an inverse function of ionic concentration and a direct function of electrolyte conductivity.

Novel apparatus and processes have been found which employ an electrochemical system comprising:
a plurality of electrodes in opposing positions in an electrochemical reaction zone;
means for applying an electrical potential between opposite electrodes;
means for flowing electrolyte through the reaction zone in a direction between the opposite electrodes to maintain electrolyte flow substantially parallel with electrical potential gradient between the electrodes;
electrically conductive discrete particles contained in a fixed position within the reaction zone; and
at least one electrically insulating foraminous separator disposed in said reaction zone transverse to electrolyte flow for separating the solid particles into bed sections of graduated thickness within the reaction zone.

Accordingly, an object of the present invention is to provide an improved electrochemical system including layered particulate bed sections of graduated thickness which are capable of handling large quantities of dilute electrolytic solutions. The process and apparatus achieve a substantially homogeneous treatment of electrolyte by flowing the electrolyte through the reaction zone in a direction between major electrode areas whereby substantially all of the electrolyte undergoes uniform treatment by passing through both anodic and cathodic zones.

It is further object to provide a high throughput capacity particulate bed reactor which is particularly effective for the recovery of metal ions from dilute aqueous solutions.

These and other objects and features of the invention will become apparent to one skilled in the art from the following detailed description and drawing.

DESCRIPTION OF THE PREFERRED EMBODIMENTS

In the following description, various representative examples of the invention are set forth to enable one skilled in the electrochemical arts to practice the invention. Unless otherwise stated, metric units are employed throughout and proportions are given on a weight basis.

The invention comprises a fixed particulate bed reactor and process wherein a plurality of particulate bed sections are maintained within an electrolytic reaction chamber. Large quantities of dilute electrolytes may be rapidly and economically processed in an apparatus which comprises two or more separate particulate electrode bed sections retained in a reaction chamber which is provided with primary electrodes and fluid inlet and outlet means.

Figure 1:
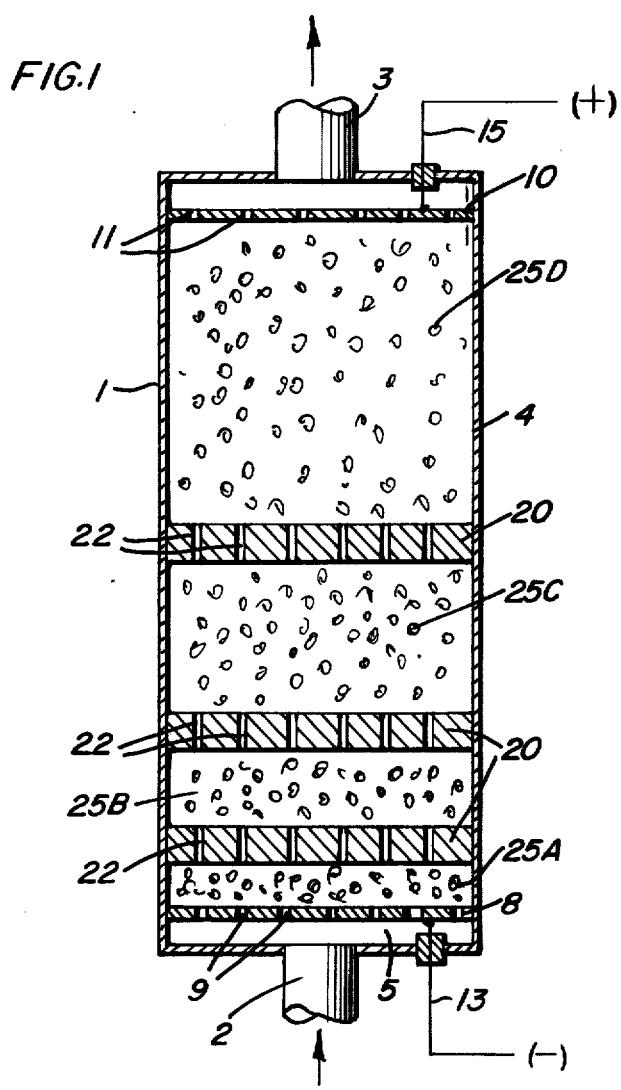
FIG. 1 is a vertical cross-sectional view of a cylindrical electrochemical reactor according to the present invention.

A detailed understanding of the invention may be gained by reference to the drawing. FIG. 1 shows an electrochemical reactor or cell 1 having fluid inlet conduit 2 and fluid outlet conduit 3. The reactor 1 comprises a closed vessel 4 constructed of an insulating material such as plastic, rubber, glass or coated metal. At the bottom of the cell 1 a foraminous electrode 8 is located and is provided with holes or perforations 9. At the top of the cell 1 is located a second foraminous electrode 10 provided with perforations 11. The bottom electrode 8 may be biased anodically by connecting it to the negative side of a DC power supply (not shown) through conductor 13. At the top of reactor 1, opposing electrode 10 is biased cathodically by connecting it to the source of DC potential through conductor 15.

Within the reaction zone of cell 1 are mounted a plurality of foraminous or perforated spacer insulators 20. In the particular device shown in FIG. 1 there are three perforated insulators 20, each of which are provided with uniformly distributed small diameter perforations 22. The perforated insulating spacer means are mounted transverse to the flow of electrolyte between electrodes 8 and 10 thereby defining four graduated bed sections 25A, 25B, 25C and 25D. Within these packed bed sections electrically conductive paricles are held in fixed position.

In the embodiment of FIG. 1 the electrochemical cell 1 has a substantially uniform cross-sectional area and is constructed as a stack of porous bed sections containing packed electrically conductive particles. The electrically insulating spacer means are disposed for fluid flow arrangement in the stack between bed sections 25A to 25D, which have different section longitudinal thicknesses arranged in an order of increasing thickness upwardly through the stack. In the preferred embodiments, the porous bed sections have increasing thickness in the direction of electrolyte flow and contain electrically conducting carbon particles; which may consist essentially of carbon pellets having a minimum dimension of one-half mm. In FIG. 1, the spacer means comprise planar insulator elements 20 mounted parallel to the primary electrodes 8, 10 to permit electrolyte flow therethrough while preventing ohmic electrical contact between adjacent bed sections.

Primary electrodes 8, 10 disposed at opposite ends of the stack are operatively connected as a part of the system in contact with the electrolyte. A pump or other means is provided for flowing electrolyte directionally through the stack whereby electrolyte is in contact with each of said porous bed sections in sequence.

This inventive concept embraces methods for changing ionic concentration in an electrolyte in an electrochemical cell having electrically conductive particles maintained between primary electrodes. The improvement comprises the following steps:

1. impressing an electrochemical potential between the primary electrodes to maintain a voltage gradient;
2. flowing electrolyte through the cell in a direction between the primary electrodes parallel to the voltage gradient;
3. maintaining the electrically conductive particles in spaced relationship to define a plurality of particle bed sections wherein particles within an individual bed are in direct contact with other particles in the same bed while preventing contact between particles in adjacent bed sections, with these bed sections having thickness graduated in a given direction between the primary electrodes;
4. passing the electrolyte in series through the bed sections under electrochemical conditions; and
5. recovering the electrolyte. For removing ions from solution by deposition, bed sections having progressively increasing thickness as a function of ionic concentration and electrical conductivity of the electrolyte provide optimum performance.

In operation of the device and electrolyte to be treated enters the cell 1 through the inlet conduit means 2. The electrolyte solution flows past electrode 8 through perforations 9. The electrolyte solution then contacts the particulate bed material located within the lowest bed section 25A. After passing through the first bed space 25A, the electrolyte solution passes through the first foraminous separator 20 through perforations 22. The electrolyte solution then contacts the second, third fourth bed sections 25B, 25C, 25D before passing through electrode 10. The electrode solution passes through perforations 11 and exits from the reactor device through outlet conduit means 3.

While electrolyte solution is passing through the device, electrical potential is imposed across the reaction zone. A DC potential creates a voltage gradient between electrodes 8 and 10. Since there is no direct ohmic contact between bed sections, electrical continuity between beds in maintained by the ionic paths of the electrolyte, which is a continuous liquid phase througout the bed sections and spacers. It is found that by maintaining this condition each bed space is capable of producing a desired electrolytic effect believed to be due to bipolar electrode effects. The reaction occurring within each bed section can be either primarily anodic, cathodic, or both, as desired.

The primary electrodes may be constructed of inert conductive material such as sintered, perforated or woven metal, drilled carbon, conductive fibers or cloth. For example, electrodes 8 and 10 may be stainless steel, copper, platinum, or non-metallic conductor such as formed carbon.

Foraminous insulators 20 are provided with a series of perforations 21 which are sufficiently large to provide flow of fluid therethrough, but means should be provided to prevent passage of the particulate material providing a fixed or static bed. Insulators 20 may be constructed of any non-conductive material such as porcelain, glass or plastic.

The primary function of the insulating spaces is to prevent direct contact between adjacent bed sections, thereby avoiding ohmic conduction through the reaction zone. Openings in the spacer permit ionic paths and substantial electrolyte flow from section to section. The separator means may have fluid openings of about $50\mu$ to $1000\mu$, and those materials having at least 50 percent open area are preferred. The size of the openings depends upon the particle size of the bed packing material, and sufficiently small openings prevent movement of bed particles from one section to another, thereby preventing ohmic contact. The spacers may be rigid and mounted to support part or all of the bed weight. For instance in FIG. 1, spacers 20 can be bonded or otherwise fixed to the shell 4 of reactor chamber 1. Likewise, a thin flexible screen cut to the cross-sectional configuration of the reactor cell can provide the insulating and fluid flow functions without becoming a structural support part of the apparatus. Materials suitable for the insulating spacer include dielectric organic polymers, rubber, silicones, reinforced glass fiber. insulated conductors, coarse glass frit and other suitable electrically insulating solids in woven, fused, cast or formed construction. Polyolefins, polyacrylates, polyvinyl chloride, nylon, polytetrafluorethylene, polyesters and phenolic resins are suitable insulating materials which are usually inert to the electrochemical reaction conditions in the cell. Ordinary plastic window screen can be easily cut to the desired shape and used in single layer or multiple layers for the spacer elements.

The electrolyte may be pre-conditioned chemically and may be filtered to remove foreign matter which may be deleterious to the desired electrochemical reaction. Particulate matter tends to clog the porous bed and should be removed.

The pH of the solution to be treated may vary over a wide range, being either acidic, neutral or basic. Desirably, the pH is from about 2 to 11. Depending upon the makeup of the solution which is to be treated, adjustment of the pH may be done by the addition of various acids, base or salts to the the solution. Suitable electrolytes which may be used are aqueous solutions of borates, ammonia, sodium chloride, sulfuric acid, calcium chloride, sodium cyanide, chloroacetates, sodium hydroxide, sodium bicarbonate, hydrochloric acid, phosphates and the like. Preferred electrolytes have an electrical conductivity (K) of at least about $5(10)^{-5}$ (ohm-cm)$^{-1}$.

The temperature of the electrolyte may also vary over a wide range, the primary requirement being that at the temperature used the electrolyte remain a liquid. Thus, temperatures within the range of about 0° to 100°C are suitable. For economy in operation it is preferred to utilize these solutions at ambient temperatures. Similarly, the present process is desirably carried out at atmospheric pressure although either sub- or super-atmospheric pressures may be employed if desired. It has been found that temperatures at 20°–70°C may be desirable in effecting a rapid reaction depending upon the particular electrolyte, pH range, type and concentration of chemical species.

The number and thickness of the bed sections can be determined for the particular electrochemical use. Several factors can influence the choice of bed thickness, including particle size, bed porosity, reaction kinetics, particle material, electrolyte flow rate and other operating conditions. The optimum bed section thickness and total cell size can be determined routinely without extensive experimentation. Ordinarily bed section thickness of about 1–10 cm is satisfactory. In the embodiments shown, the bed sections are divided into intervals in a gradation series. In order to minimize the cell size, the separators should take up a relatively small fraction of the cell volume. In the preferred embodiments of this invention, the bed packing materials occupy more than 90 percent of the effective cell chamber volume between primary electrodes. The number of sections may be fairly large; however, most cells can employ 2 to 20 sections between primary electrodes.

The electrolyte is treated in a suitable electrolytic cell which contains a bed of particles which are distributed in the electrolytic reaction zone of cell, such that the superficial porosity of the bed ranges from about 10 to 50 percent.

The preferred packing material is graphite in pellet form. Activated carbon in granular, spherical or other form is desirable for many electrolytic or electrosorptive processes. In the examples Norit RB-II is used extensively. This particulate material consists of extruded graphite in pellet form about 2 mm in diameter and 3–10 mm in length. An average particle size from about $50\mu$ to $10,000\mu$ is preferred, with those particles larger than one-half mm being optimum. It is preferred that the beds be homogeneous; however, different materials may be used in different beds arranged serially. Other particles employed to form the porous bed in the present process are solid, particulate materials that may be conductive, non-conductive or semi-conductive. The material of which the particles are made will normally be considered ohmic-conducting material. Where the particles are conductive, they may have a metallic surface, either by virtue of the particles themselves being metallic or by being made of non-conductive material on which a metallic surface has been deposited. Typical of the metals which may be employed are platinum, copper, silver, and the like. Additionally, the conductive particles may be electrically conductive metal compounds, such as ferrophosphorus, the carbides, borides or nitrides of various metals such as tantalum, titanium and zirconium, or they may be various electrically conductive metal oxides, such as lead dioxide, ruthenium dioxide and the like. Various semi-conductive materials of which the particles may be made are fly ash, carbon, zirconia, alumina, conductive glasses and the like.

Electrolyte flow can be varied widely. A meaningful criterion for throughout of treated electrolyte is the volumetric ratio of electrolyte per unit volume of the electrochemical reaction zone. From a fully packed cell with homogenous flow, successful electrochemical reactions can be carried to substantial completion in a single pass at flow rates of about 130-160 ml/liter-minute (1–1.2 gal/ft$^3$-min.). In a static bed the flow rate and residence time are adjusted to the particular electrochemical phenomenon and cell configuration. For many electrochemical processes the electrolyte flow is maintained in the laminar regime; however, turbulent flow is desirable for some uses.

The voltage impressed across the cell will depend upon the inter-electrode distance and the nature of the reaction being conducted. Typically it is found that a DC potential gradient on the order of about 0.1 to 10 volts/cm be used.

The electrolyte solutions treated in the novel electrochemical cell may comprise dilute solutions of metallic ions including Cu, Au, Cr, Ni, Ag, etc. In addition, it is contemplated that chemical reactions which involve oxidation and/or reduction reactions may be conducted within the cell. Typical applications include adsorption and desorptions of organic compounds, oxidation of sewage and other wastes (including cyanide plating baths), synthesis of organic and inorganic compounds, reduction of hexavalent chromium ion, electrochemical precipitation and coagulation processes, collection of slimes, oils and paints desalting of saline waters and many other useful industrial operations.

Figure 2A:
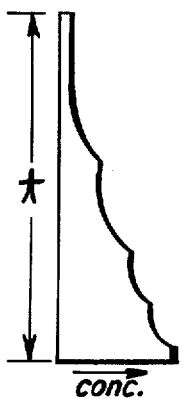
FIGS. 2a and 3a are graphic representations of cell operating conditions including a profile of electrolyte concentration and voltage gradients.
Figure 2:
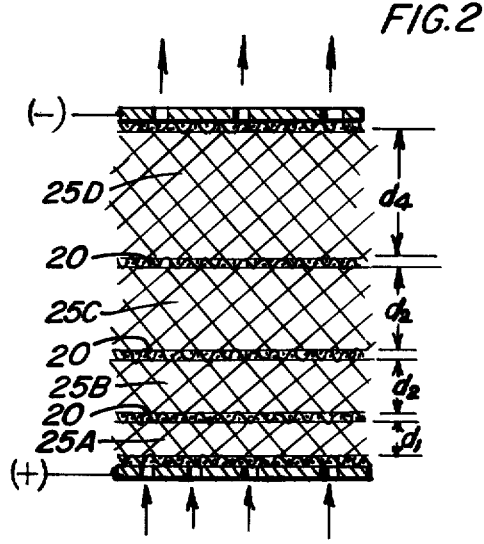
FIGS. 2 and 3 are schematic cross-sectional representations of various modifications of the reactor.

An alternative embodiment of the invention is shown in FIG. 2 of the drawing, which is a vertical cross-section view in schematic form. Electrodes 8 and 10 are disposed in opposing positions in the electrochemical reaction zone, and have means for applying an electrical potential between them to establish a voltage gradient across the cell. Porous bed sections 25A, 25B, 25C 25D, within the reaction zone are separated by insulating foraminous separators, such as planar screens 20, which may be made of polypropylene or other polymeric material. The screen separator are disposed in the reaction zone transverse to the path of the electrolyte flow, indicated by arrows. In an electrochemical cell according to FIG. 2 the thickness ($d_1$, $d_2$, $d_3$, $d_4$) of adjacent beds increases in a given direction according to geometric or other mathematical progression. For instance, the increase from one adjacent section to another may be defined as $d_n = d_{(n-1)} \times (1+K)$. In FIG. 2, the increase is about 50 percent.

FIG. 2a is correlated with the cell structure of FIG. 2 to show a typical concentration profile. This is a plot of cell distance ($t$) vs. ionic concentration in an electrolyte where the ionic species is removed by electrolysis. The removal rates are a function of ionic concentration and layer thickness. The anode and cathode are perforated or foraminous to permit flow of electrolyte through the electrodes and reaction zone in a relatively straight fluid path. Optional insulating diaphragms are shown adjacent to electrodes 8, 10 in FIG. 2.

Figure 3A:
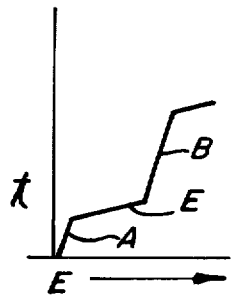
Figure 3:
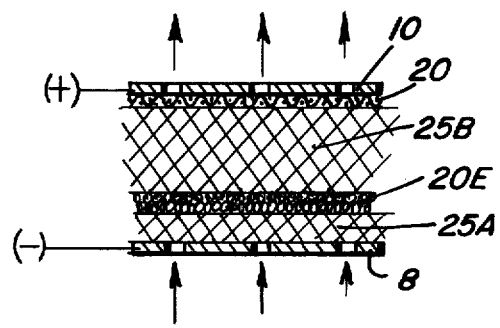

A further modification of the stacked electrochemical cell is shown schematically in FIG. 3, wherein a stack of separate porous beds 25A, 25B each of which contains discrete electrically conductive particles, is separated mechanically by a loose layer of insulating beads 20E. This spacer means can be constructed by pouring alternate layers of conductive particles and at least one porous layer of insulating beads into a reaction vessel. The separating layer 20A is disposed in the stack between beds in a manner which prevents direct contact between the bed electrically while permitting fluid flow between beds. Electrodes 8 and 10 are located at opposite ends of the stack and provided with means for flowing electrolyte through the stack serially in contact with the electrodes. The plurality of beds and insulating bead layer is maintained in fixed position in fluid communication with one another. The screen element 20 may be omitted if section 25B is to be biased anodically relative to the rest of the system.

In FIG. 3a, a typical voltage gradient or profile is shown wherein the cell distance (t) is plotted vs. change in electrical potential (E). The slope at curve portion A corresponds to the voltage gradient of bed section 25A; the slope at E corresponds to spacer means 20E, and the slope at B corresponds to section 25B.

The mathematical relationships between a series of ideal bed sections is usually dependent upon the electrochemical phenomena of the particular process. Where ions are being removed by electrolysis, the ionic concentration decreases progressively through the cell. Electrolyte conductivity may be due to several ionic species, not all of which are altered in concentration by the treatment. The system of this invention is achieved by varying sequential bed sections in thickness according to the square root direct function of electrolyte conductivity and the inverse square root function of the ionic species being altered.

In electrolyte plating from dilute ionic solutions the depth of penetration where deposits are observed in the individual sections depends upon electrolyte conductivity and concentration of the deposited ionic species. It is understood that the voltage impressed across the cell creates a multitude of localized bipolar electrodes and monopolar layers. The structuring of the particle bed to prevent ohmic contact between adjacent bed sections permits current to flow between bed sections by ionic transfer through the fluid-pervious openings of the insulating spacers which separate the bed sections.

Electrically conductive particles within each bed section are in direct contact with other particles packed together or otherwise in physical contact. The plating of metallic deposits is observed on particles largely on a cathodically-biased portion of the bed section. The depth of penetration of these plating zones in a direction away from the spacer is a function of conductivity and concentration. The penetration is directly related to electrolyte conductivity; therefore, the addition of ionic salts, acids or bases can be utilized to optimize conductivity and influence bed section performance.

The deposited ionic species concentration bears an inverse relationship to plating penetration. Therefore, as ions are removed from the electrolyte passing serially through a multiple bed reaction zone, the concentration decreases and the penetration depth on individual bed particles increases. Accordingly, a significant part of this invention concerns progressive increase of bed section thickness in the direction of fluid flow for processes which remove ions from solution.

The depth of penetration for electrolytic deposits is found to be independent of the bipolar units and monopolar layers. Penetration does not vary significantly with particle size of the bed.

Plural or compound cells are feasible constructions which utilize the inventive concept. Electrolyte flow can be arranged for parallel cells. Flow can be effected serially from one cell to another with the effluent of one cell being connection to the inlet of another. In the configurations of FIGS. 1–3, upflow of electrolyte carries gas bubbles away from the packed bed, whereas it is possible to have gas locking conditions in a downflow arrangement, if the linear velocity of the electrolyte prevents gravitational rise of the evolved gas.

Graduated layering of the electrochemical reaction zone provides contact aggromerates of electrically conductive particles which can function as effective bipolar layers. Each bed section can contain one or more monolayers of electrically conductive particles, arranged in flat planar configuration or curved shape.

Figure 4:
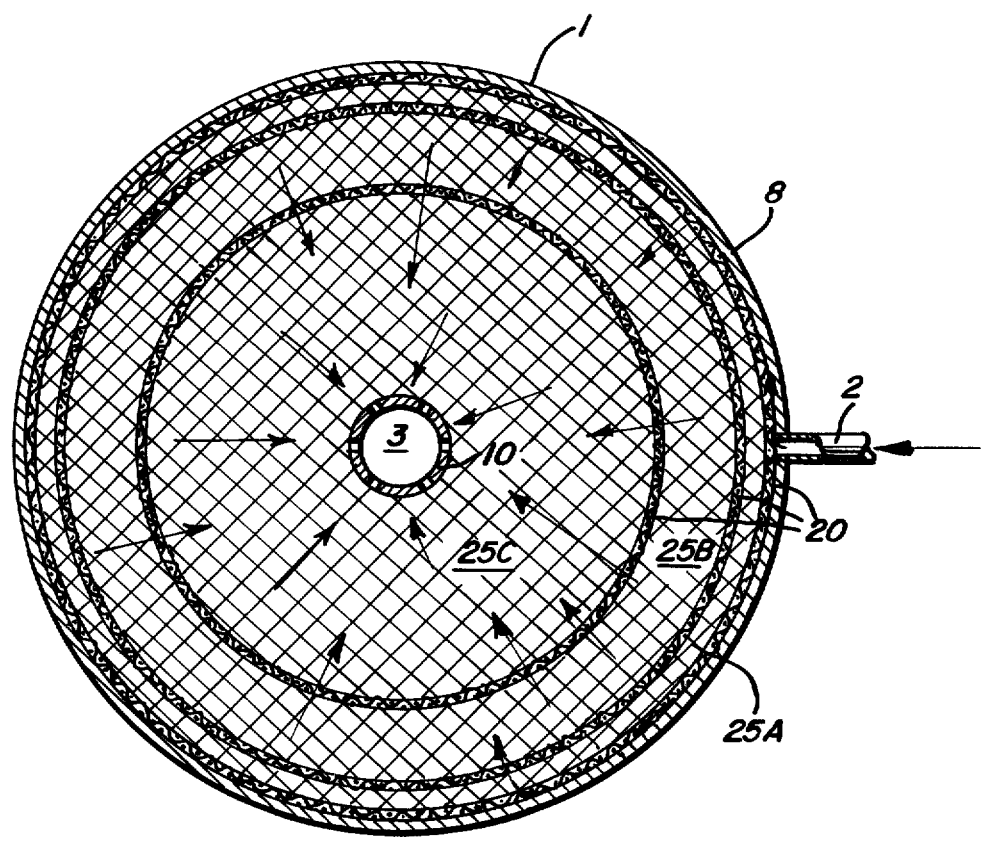
FIG. 4 is a horizontal cross-sectional view of an alternative concentric shell embodiment of the invention.

As an example of non-polar cell configuration, a concentric shell electrolytic cell 1 is shown for horizontal cross section in FIG. 4 of the drawing. Electrolyte input means is provided by conduit 2, which may be in the form of a single pipe or a radially spaced set of inlets. Electrolyte is distributed laterally across the interior surface of the shell electrode 8, which can be biased anodically or cathodically as part of the cell structure. A plurality of bed sections 25A, 25B & 25C are spaced apart by insulating screens 20. The opposite electrode 10 is constructed in the form of a perforated pipe located at the center of cell 1. This electrode is operatively connected to an outlet means 3. The concentric shell reactor may be mounted vertically to permit removal of evolved gas by gravity and venting. Electrolyte flow is essentially parallel to the voltage gradient. In this embodiment the flow is shown in a radially inward direction from the outer concentric shell to the center. Bed sections 25A, 25B and 25C have radial thickness dimension which increases inwardly in the direction of electrolyte flow. In this alternative embodiment, it is possible to design a cell having sections with equal volume but variable thickness. This configuration als has the property of increasing current density from the outer to inner electrodes. The flow direction and/or voltage polarity may be reversed. Likewise the order of thickness may be reversed.

Other cell configuration which may employ the inventive concept include a cylindrical cell similar to FIG. 4, but having the insulating spacer screen in the form of a flexible continuous sheet disposed in helical form. This could be provided by increasing the helical pitch. A cartridge-type series of bed sections can be utilized wherein one or more sections are removed or replaced when desired. More than one reaction can be carried out at the same time in the cell. For instance, cathodic plating of metal from aqueous cyanide solution can be concurrent with anodic oxidation of cyanide ions. Addition of chloride ion to the electrolyte feed is effective to destroy cyanide, as in U.S. Pat. No. 3 719 570 to Lancy.

EXAMPLE I

The novel electrochemical cell is used to recover gold from a dilute aqueous rinse solution containing 2.0 ppm Au as KAu $(CN)_2$. The cell is constructed similar to FIG. 1 of an acrylic plastic cylinder with 2.5 cm inside diameter and an effective interelectrode distance of 26 cm between parallel primary electrodes mounted normal to the longitudinal axis. The electrodes are drilled carbon about 2 cm thick with the bottom being anodically biased.

The electrically conductive particles are carbon pellets (60 g, Norit RB-II) having an average diameter of about 2 mm and about 3–7 mm in length. The spacers consist of a triple thickness of poly (vinyl chloride) screen mesh cut in 2.5 cm circles. Bed sections are provided having increasing thickness in the direction of fluid flow from the bottom up. Four bottom layers are about 1.3 cm thick each, followed by four 2.5 cm layers, one 3.2 cm layer and two 3.8 cm layers. Bottom and top layers are in direct contact with the primary electrodes. A total of 10 triple insulating spacer screens are provided, dividing the packed carbon bed into eleven sections with the thinner sections operatively connected in fluid flow arrangement to the inlet electrolyte means. The outlet is operatively connected behind the thickest section, where electrolyte concentration is lowest.

The primary electrodes are operatively connected to a power supply which provides 0–125 VDC potential. The cell is operated a about 90 VDC, giving an average voltage gradient of about 3.5 V/cm. The current density is maintained substantially constant (c.d. = 4 ma/$cm^2$) throughout a continuous run during which the electrolyte is pumped at a constant upflow rate of 130 ml/liter-min. The electrolyte has conductivity of $10^{-4}$ $ohm^{-1}$ $cm^{-1}$ at pH9.

Figure 5:
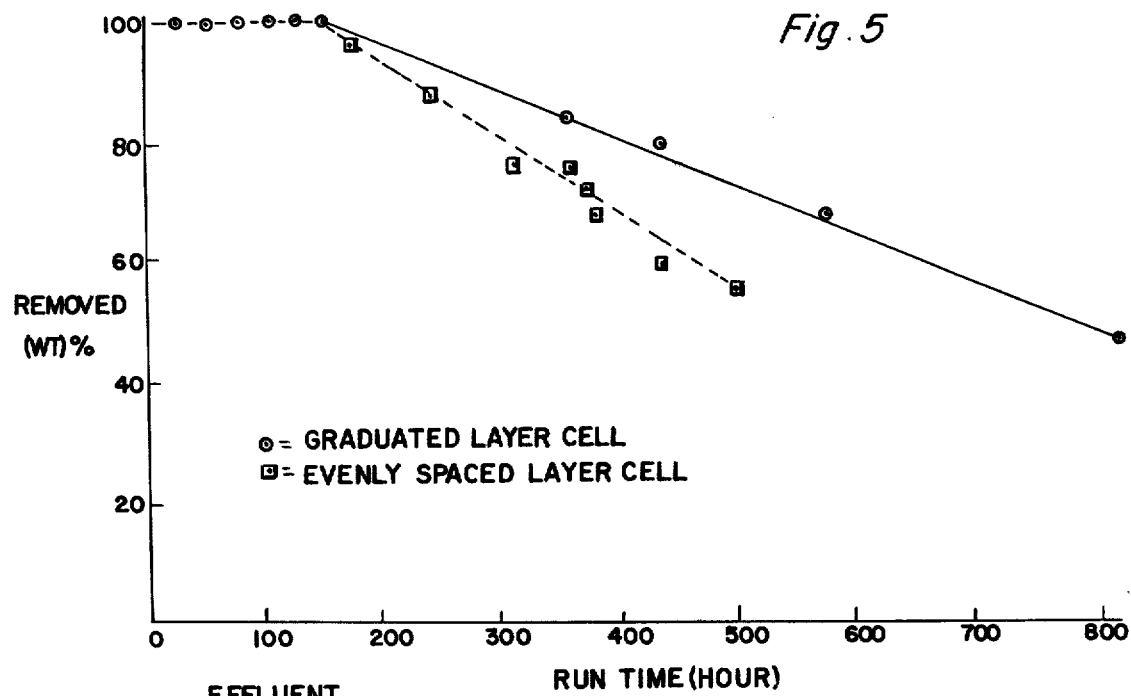
FIG. 5 is a graph showing metal removal vs. time.

During a continuous run on the aqueous gold rinse solution, essentially 100 percent removal is effected for the first 150 hours, decreasing to less than 50 percent at 800 hour. In this run about 2.5 parts Au/100 parts C was accumulated. This run is plotted in FIG. 5 for comparison with a similar 26 cm cell having eight equally spaced bed sections and operated under the same current density (c.d. = 4 ma/$cm^2$).

The useful operating life of the cell is extended considerably by using the variable bed section spacing. At the terminal 50 percent removal, the improved cell of this invention has more than 200 hours of useful life.

Figure 6:
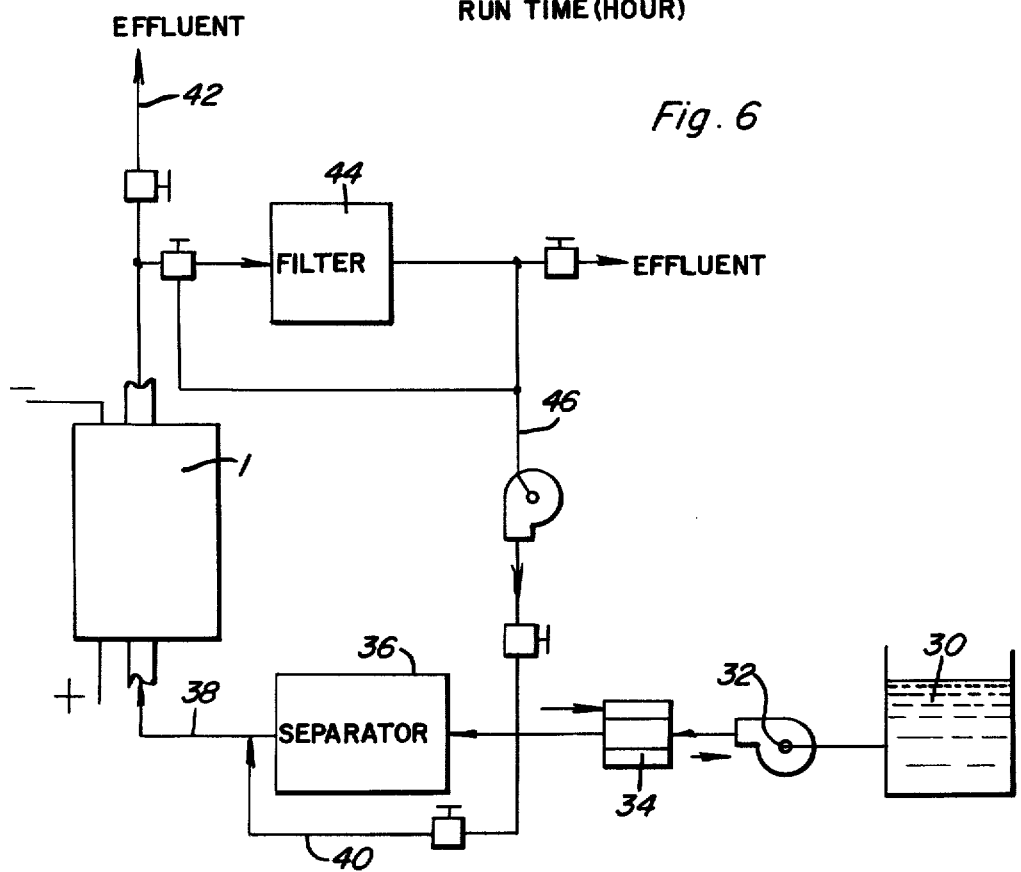
FIG. 6 is a flow sheet showing the relationship of the improved process and apparatus to various conventional components of a typical industrial installation, in schematic form.

Referring now to FIG. 6, electrochemical cell 1 is shown connected to a source of electrolyte, such as tank 30. Chemical treatment of the feed solution (pH, conductivity, etc.) may take place in the tank. A pump 32 provides means for circulating electrolyte through the reaction zone of cell 1. Temperature of the electrolyte may be preconditioned to heat or cool the electrolyte with heat exchanger 34. If the electrolyte contains particulate matter for which removal is required, or if liquid/gas separation is required, a suitable separator 36 may be used for this operation in the electrolyte supply line 38 leading to the electrochemical cell 1. A bypass conduit 40 may pass electrolyte around the separator 36. Effluent from the electrochemical cell 1 may be passed through conduit 42 if no further treatment is required. A post treatment may be used where desired to remove particulate matter generated in the electrochemical cell 1. Filter 44 is provided for this purpose. An alternate effluent line is provided for the effluent from filter 44, or a suitable bypass 46 may recycle electrolyte through the electrochemical cell 1.

The cell may be operated in recovering metal values from aqueous electrolytes. Since such electrolytic reactions are usually reversible, accumulated metal deposited on inert electrically conductive carbon particles can be recovered by deplating the metal. Cathodic electrode areas are stripped by reversing the electrical polarity. For instance Au, Cn or Ag can be deplated by contacting the bed with a suitable electrolyte during a regeneration step. Precious metals may be recovered by removing the entire bed and burning off the carbon.

While the process and apparatus of this invention are particularly useful for treatment of large quantities of dilute aqueous electrolyte solutions, concentration of dissolved or suspended matter is not limiting on the use of the invention. Solutions containing less than 1 ppm (part per million) solute can be treated; however, some electrochemical reactions can employ 5 percent or more solid matter. In general, the electrolyte conductivity is substantially less than that of the particulate bed material. The electrical parameters can vary widely, especially with regard to voltage gradient and current density in the cell.

In the recovery of precious metals such as Au, Ag, Pt, the loading of the packed bed particles is significant to the economical operation of the cell. The present system achieves in excess of ⅛ troy oz. of gold per pound of carbon (3.5 parts Au/100 parts C) deemed to be minimum for economic feasibility of the system. In order to conserve space and obtain complete treatment of the electrolyte, care should be taken in design of the electrochemical cell to maintain homogeneous flow conditions between the major opposing electrode surfaces. Ordinarily, means is provided for flowing electrolyte at a linear velocity of about 0.1 to 100 cm/sec., preferrably about 1 to 10 cm/sec. Current densities (based on total cross-sectional area of the reaction zone) of about 0.1 to 100 ma/$cm^2$ may be used, depending upon the particular electrochemical reactions involved. The preferred current density for gold recovery from dilute cyanide solutions is about 1–10 ma/$cm^2$.

Cell configuration may be adapted according to well known electrochemical standards. While the cylindrical cross section of the cell, as shown in FIG. 1, is easily constructed and maintained, rectangular cells or other similar shapes may be used within the inventive concept.

In the practice of invention, present invkention, it is important that the cell be designed to provide uniformity in the flow of electrolyte from one primary electrode to the opposite primary electrode. This results in a homogeneous treatment of the electrolyte. Substantially all of the fluid flow paths have a net direction essentially parallel to the voltage gradient between primary electrodes. To achieve this object, the use of foraminous major electrodes permits electrolyte to be introduced to the reaction zone in a direction which is essentially perpendicular to the primary electrode surface and the transverse insulating spacers. Liquid flow is thereby maintained essentially unidirectional and parallel to the voltage gradient through the reaction zone.

While the invention has been shown by specific examples, there is no intent to limit the inventive concept except as set forth in the following claims.

What is claimed is:

1. An electrochemical cell which comprises:
   a stack of porous bed sections containing packed electrically conductive particles and a substantially uniform cross sectional area;
   electrically insulating spacer means disposed for fluid flow arrangement in said stack between said bed sections to provide different section longitudinal thicknesses arranged in an order of increasing thickness across said stack;
   primary electrodes disposed at opposite ends of said stack and operatively connected thereto;
   means for flowing electrolyte through said stack in the direction of increasing bed section thickness whereby said electrolyte is in contact with each of said porous bed sections in sequence; and
   means for applying an electrochemical potential across said stack in a direction parallel to electrolyte flow.

2. The cell of claim 1 wherein said porous bed sections contain electrically conducting carbon particles.

3. The cell of claim 2 wherein the particles consist essentially of carbon pellets having a minimum dimension of one-half mm.

4. The cell of claim 1 wherein the spacer means comprise planar insulator elements mounted parallel to said electrodes to permit electrolyte flow therethrough while preventing ohmic electrical contact between adjacent beds.

5. The cell of claim 1 wherein spacer means comprise at least one porous layer of insulating particles disposed between adjacent beds and supporting at least one of said beds.

6. In an electrochemical cell wherein a porous bed of electrically conductive particles is disposed between primary electrodes to define a reaction zone and wherein means is provided for flowing electrolyte through the bed substantially parallel to voltage gradient between the primary electrodes, the improvement which comprises:
   insulating spacer means for separating the porous bed transverse to the direction of flow to provide ionically conducting fluid paths between sections of the bed while preventing ohmic conduction between bed sections, said spacer means being disposed to define beds sections having graduated thickness where homogeneous treatment of the electrolyte is obtained.

7. In an electrochemical cell according to claim 6, said bed sections and spacer means being operatively connected for serial fluid flow between bed sections with bed section thickness in the direction of electrolyte flow increasing as an inverse function of ionic concentration and a direct function of electrolyte conductivity.

8. In the method for changing ionic concentration in an electrolyte in an electrochemical cell having electrically conductive particles maintained between primary electrodes; the improvement which comprises:
   impressing an electrochemical potential between the primary electrodes to maintain a voltage gradient;
   flowing electrolyte through the cell in a direction between the primary electrodes parallel to the voltage gradient;
   maintaining the electrically conductive particles in spaced relationship to define a plurality of particle bed sections wherein particles within an individual bed are in direct contact with other particles in the same bed while preventing contact between particles in adjacent bed sections; said bed sections having thickness graduated in a given direction between the primary electrodes;
   passing the electrolyte in series through said plurality of bed sections under electrochemical conditions; and recovering the electrolyte.

9. The process of claim 8 including the steps of providing bed sections having progressively increasing thickness as a function of ionic concentration and electrical conductivity of the electrolyte.

10. Electrochemical reactor apparatus which comprises:
    an integral reactor chamber having spaced primary electrodes adjacent to fluid inlet and outlet means located at opposite ends of said chamber defining an inter-electrode reaction zone; foraminous insulating bed spacer means positioned transversely within said chamber between said primary electrodes, said support means defining a series of bed sections between said electrodes, said bed sections having varying longitudinal thickness; and a fixed bed of discrete particulate electrode material retained within said bed sections.

11. The apparatus of claim 10 which contains more than two bed sections.

12. The apparatus of claim 10 wherein said particulate material consists essentially of carbon pellets of at least 1/2 mm size.

13. The apparatus of claim 10 including means for flowing electrolyte in parallel with electrical current in said reactor chamber.

14. An electrochemical cell which comprises:
    a stack of porous bed sections containing packed electrically conductive particles and a substantially uniform cross sectional area;
    electrically insulating spacer means disposed for fluid flow arrangement in said stack between said bed sections to provide different section longitudinal thicknesses arranged in an order of increasing thickness across said stack, said spacer means defining thickness of adjacent beds increasing in a given direction according to geometric progression;
    primary electrodes disposed at opposite ends of said stack and operatively connected thereto;
    means for flowing electrolyte directionally through said stack whereby said electrolyte is in contact with each of said porous bed sections in sequence; and
    means for applying an electrochemical potential across said stack in a direction parallel to electrolyte flow.

* * * * *